E. G. BANNER.
DRAIN-TRAP.

No. 183,279. Patented Oct. 17, 1876.

WITNESSES:
Solon C. Kemon
Chas. A. Pettit

INVENTOR:
E. G. Banner
BY
ATTORNEYS.

UNITED STATES PATENT OFFICE.

EDWARD G. BANNER, OF LONDON, ENGLAND.

IMPROVEMENT IN DRAIN-TRAPS.

Specification forming part of Letters Patent No. 183,279, dated October 17, 1876; application filed September 27, 1876.

*To all whom it may concern:*

Be it known that I, EDWARD G. BANNER, of Billiter Square, in the city of London, England, have invented a new and Improved Drain-Trap; and I do hereby declare that the following is a full, clear, and exact description of the same.

This invention relates to a balanced-lever trap for preventing inflow of noxious gases from sewers, cess-pools, or drains through the soil or other pipes leading from water-closets, sinks, or elsewhere in dwelling-houses. This improved trap is entirely self-acting. It is always perfectly air-tight, flushes clean, and cannot be unsealed by the action of the sewer. Moreover, it effectually prevents the ingress of vermin and the return of the sewage into the pipes, which is a great advantage for all low-lying districts, where this danger exists in times of floods or high water, the construction of the trap being such that the greater the pressure of the returning sewage against the trap the more tightly is the trap closed, so that no flood-water, sewage, or sewage-gas can possibly be forced past it into the basement or any other part of the house.

The construction of the trap is illustrated in the accompanying drawing, in which—

Figure 1:
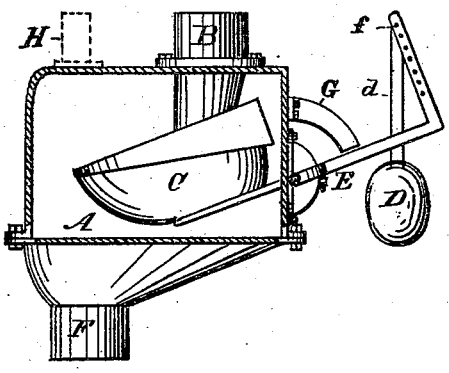
Figure 2:
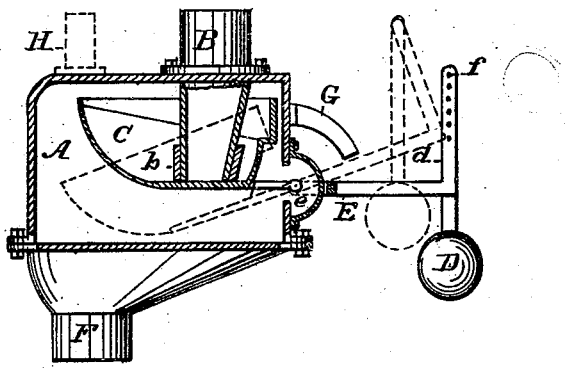

Figure 1 shows a side elevation of the trap in the position it assumes when flushing, the front cover-plate being removed. Fig. 2 shows a longitudinal vertical section of the trap.

This trap is placed in or near the basement, inside or outside of the house, at the lower end of the soil or other pipe to be trapped; but it might, if preferred, be fixed, in place of the ordinary D-trap, immediately under the container of a closet.

A is a small air-tight chamber, of cast-iron or other material, into which the soil-pipe B, or other pipe to be trapped, is led, which latter projects several inches through the top into the interior of the chamber A. The end of pipe B has an india-rubber band, *b*, sprung onto it, and kept in place by a flange on the pipe, the band slightly projecting beyond the end of the pipe, as shown, so as to form a seat for the bottom of a valve cup or pan, C, (made of copper tinned inside,) to be pressed up to or against the pipe B, to close the end of the same. The valve cup or pan C, which is of peculiar form, and of larger diameter than the end of pipe B, as shown, is carried by a lever, E, fulcrumed in gun-metal bearings in an air-tight center at *e*, and provided with a counter-weight, D, hung at its other extremity, by which the valve cup or pan C is pressed up to or against the india-rubber face, *b*. The bottom of chamber A is sloped downward to the outlet-pipe F, which connects with the sewer or drain. The lower part of the valve cup or pan C is scoop-shaped, with a perfectly-flat bottom, while its upper part is surmounted by a sloping hood of larger dimensions. The weight D on the end of the lever E is sufficient to maintain the valve cup or pan C in the closed position, with a column of several inches of fresh overflow-water in the bottom of the soil-pipe B, besides the clean water left in the lower part of the valve cup or pan C after flushing. When the closet is used, and the water rises beyond a certain height in the soil-pipe B, it passes into the valve cup or pan C, which, when filled, overcomes the counter-weight D, and is tilted, as shown in Fig. 2, and remains in this position a sufficient time to allow the trap to be thoroughly flushed, after which the valve cup or pan is returned, by the action of the weighted lever, to its normal position, in which it is not only closed air-tight against the face-ring *b*, but there is a water-seal of several inches depth formed by the water remaining in the valve cup or pan and soil-pipe, as above mentioned.

It will be observed that the end of the soil-pipe B is never unsealed, as even in the tilted position of the valve cup or pan C it still dips into the water contained therein, and the passage of sewage-gas into the pipe B is thus at all times effectually prevented.

G is a stop to limit the movement of the lever E. The counter-weight D is hung from the lever E in such manner that when the valve cup or pan C is tilted, and in the act of flushing, the center of gravity of the weight D is brought nearer to the fulcrum *e*, whereby the effective power of the weight is reduced sufficiently to allow the valve cup or pan to remain tilted until it is thoroughly flushed, yet retaining sufficient power to completely close the trap again after flushing. For this purpose the end of the lever is bent upward at a right angle, as shown, and the weight D is suspended by a link, d, connected to the raised end of the lever by a pin, f, passed through one of a series of holes in the lever, the connection being adjustable to enable the action of the weight to be properly regulated.

The soil-pipe B may, if necessary, have a bend in it just above the trap, to break the force of the water in its descent.

This trap is particularly applicable for use in connection with a system of ventilation for soil and drain pipes described in another application for Letters Patent of the United States filed by me of this same date, and when so used the usual D-trap beneath the closet may be dispensed with.

In order to ventilate the drain, cess-pool, or sewer, a pipe, H, (represented by dotted lines,) may be led from the upper side of the chamber A to above the roof of the house, and surmounted by an extracting or ventilating cowl, forming the subject of another application for Letters Patent, also filed of this date.

Having thus described my invention, what I claim as new is—

The balanced-lever trap, constructed and operating substantially as herein shown and described, and consisting of the oscillating valve cup or pan C, carried by a lever provided with a counter-balance, in combination with the containing-case and the soil-pipe B, which dips into and is closed by the said valve cup or pan, substantially as and for the purpose described.

The above specification of my invention signed by me this 21st day of July, 1876.

EDWARD GREGSON BANNER.

Witnesses:
  WILMER M. HARRIS,
  JOHN DEAN,
*Both of No. 17 Gracechurch Street, London.*